United States Patent
Pelletier

[15] 3,690,481
[45] Sept. 12, 1972

[54] APPARATUS TO DISPLACE A SNOWMOBILE

[72] Inventor: Marc Pelletier, Ste-Flore, Quebec, Canada

[73] Assignee: Ebenisterie Pelletier Enr., Quebec, Canada

[22] Filed: Dec. 11, 1970

[21] Appl. No.: 97,199

[30] Foreign Application Priority Data

Dec. 18, 1969 Canada......................070,662

[52] U.S. Cl....................................214/85, 188/176
[51] Int. Cl..............................................B65g 67/02
[58] Field of Search............214/85, 334; 188/5, 176; 280/79.1

[56] References Cited

UNITED STATES PATENTS

| | | | |
|---|---|---|---|
| 3,285,447 | 11/1966 | Junion | 214/85 X |
| 2,812,081 | 11/1957 | Schrader | 214/85 |
| 3,361,437 | 1/1968 | Loftis | 188/5 X |

FOREIGN PATENTS OR APPLICATIONS 1,264,970   3/1968   Germany..................214/334

Primary Examiner—Albert J. Makay
Attorney—Raymond A. Robic

[57] ABSTRACT

An apparatus to be used for displacing a snowmobile, the apparatus being formed of a platform mounted on swivelling wheels and provided at one end with braking shoes to avoid rolling of the platform when the snowmobile comes down from the platform on its own power. The apparatus is also preferably provided with a s semi-rigid strip at the other end of the platform to be used by the snowmobile to climb thereon, always under its own power, without the platform moving away from the snowmobile.

7 Claims, 6 Drawing Figures

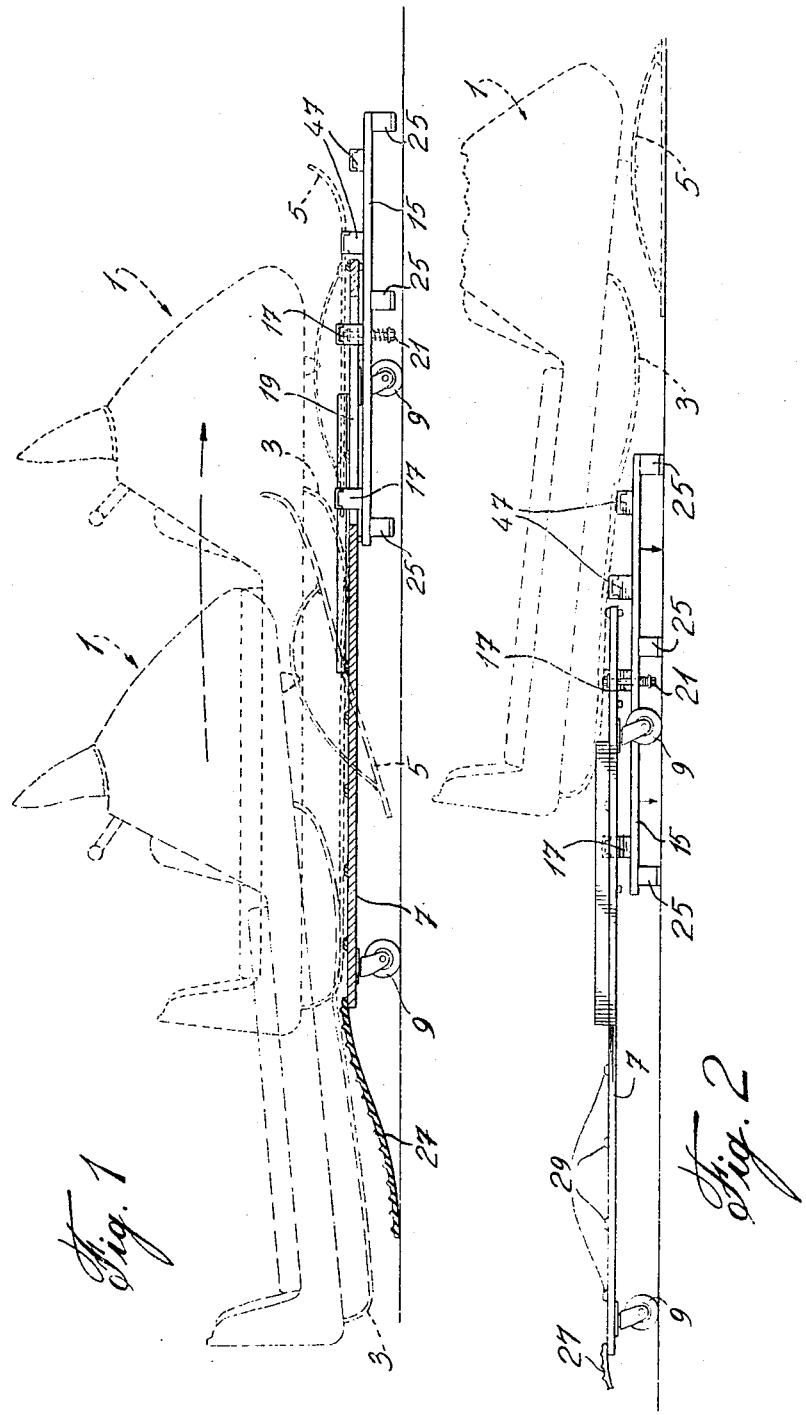

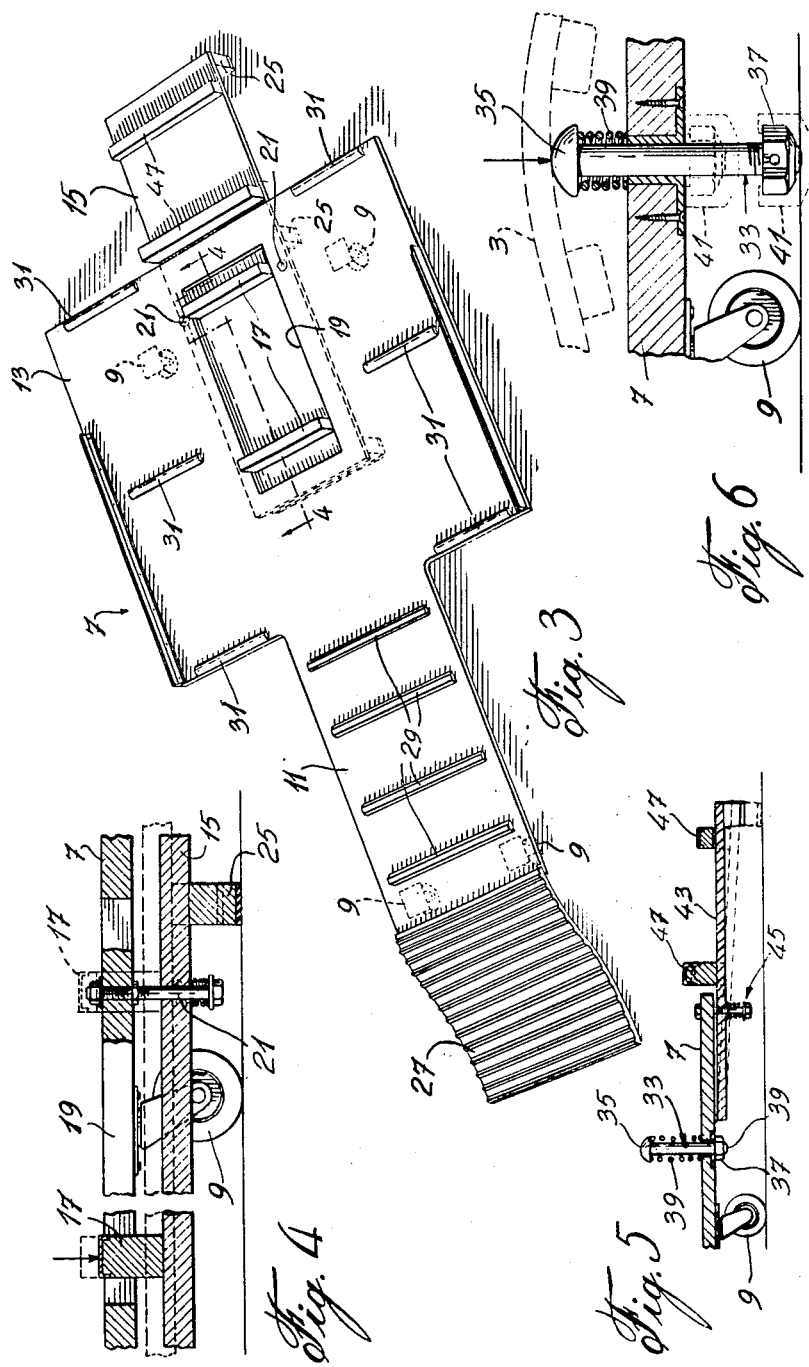

APPARATUS TO DISPLACE A SNOWMOBILE

The present invention relates to a non-motorized apparatus or vehicle for the displacement of a snowmobile.

Storing snowmobiles is often a difficult problem because the storing space is generally small and ill-located such as the corner of a garage. It is usually impossible to have the snowmobile reach its storing position under its own power because of the stiffness of its steering gear. A snowmobile is simply not made to be handled in a restricted space. The solution in most cases is to displace it by lifting it which is surely not an easy way in view of the relatively great weight of the vehicle and this difficulty is obviously considerably greater if the snowmobile must be lifted by a single person.

It has readily come to mind to solve this problem by using a handling platform mounted on swivelling wheels such as those used for moving furniture about and which can swivel in all directions. It has, however, become evident that such a platform is inadequate because as the snowmobile comes down from it and when the forward steering skis touch the ground, the endless track violently pushes the platform back due to the absence of resistance with respect to the skis which are then locked on the ground. Serious injuries may even result from the operation. It would also be difficult to load the snowmobile on the platform under its own power as the platform would tend to move away.

It is therefore the main object of the invention to overcome the aforesaid disadvantages by providing a apparatus intended to serve for the displacement of a snowmobile, apparatus which would not present such accident hazards. More specifically, the vehicle of the invention is provided with means that allow it to remain steady during all the time that the snowmobile climbs on the platform or comes down therefrom.

These objects of the invention can be found in an apparatus comprising a platform mounted on swivelling wheels and having a rearward part and a forward part respectively for the climbing and the dismounting of the snowmobile. This apparatus is provided with braking means in the forward part of the platform and across the path of the snowmobile endless track, the said means comprising a vertically movable member capable of being depressed under the weight of the snowmobile through the endless track to apply a pressure on the ground in order to lock the platform and prevent it from moving away when the snowmobile descends. The platform preferably has a semi-rigid strip at the rear, strip which is sufficiently long to reach the ground and which serves as a loading platform to allow the snowmobile to climb on the platform.

In a first preferential embodiment of the invention, the braking means comprises the said movable member formed as a plate mounted beneath the platform at the forward part thereof; the plate has at least one rib, on the upper face, extending transversely to the direction of movement of the snowmobile, the rib passing freely through an opening formed across the platform and having a height such as to protrude and extend beyond the upper surface of the platform. The braking means further comprises resilient means biasing the plate against the platform to thus allow free displacement of the apparatus. Finally, this plate comprises at least one braking shoe mounted thereunder and adapted to be applied on the ground when the endless track of the snowmobile presses on the rib during displacement of the snowmobile toward the forward part.

In a second preferential embodiment of the invention, the braking means comprises a pair of locking bolts extending freely across the forward part, each having a head at each end to prevent removal from the platform and each having a spring between the upper head and the upper surface of the platform. The bolts have a length sufficient for the lower head to be applied against the ground when depressed by the snowmobile as the latter moves forward.

The invention will be better understood by the description that follows of preferential embodiments, description that refers to the appended drawings wherein:

FIG. 1 is a vertical cross-sectional view of the apparatus according to the invention, a snowmobile being illustrated in broken lines, in climbing position as well as in mounted position;

FIG. 2 is a side elevation view of the apparatus according to the invention during unloading of the snowmobile, the latter being again illustrated in broken lines;

FIG. 3 is a perspective plan view of the apparatus according to the invention and to a first embodiment;

FIG. 4 is a cross-sectional view along line 4—4 of FIG. 3;

FIG. 5 is a cross-sectional view of the forward part of the apparatus according to a second embodiment of the invention, the braking means being illustrated in inoperative position;

FIG. 6 is a view in cross-section similar to that of FIG. 5 but on a larger scale, illustrating the braking means in operative position.

Referring now to FIGS. 1 and 2, the apparatus according to the invention is intended to serve for the displacement of a snowmobile such as illustrated and comprises a body 1 mounted on a driving endless track 3 and steering skis 5 forwardly of the body 1 and of the endless track 3. It is unnecessary to give further details of the snowmobile since it is of conventional construction. It is sufficient to indicate that the endless track 3 is generally arranged rearwardly of the skis 5 and extends along the central longitudinal axis of the snowmobile.

The apparatus according to the invention comprises a platform 7 mounted on swivelling wheels 9 such as those used with furniture and that can swivel 360°. The platform 7 has the general shape of a T of which the stem forms the rearward part 11 that merges with the crossbar forming the forward end 13 of the apparatus. The braking means are located in the forward part 13 and are disposed across the path of the endless track 3. Such means generally comprises a vertically movable member capable of being depressed under the weight of the snowmobile when the endless track passes thereover to apply a pressure on the ground in order to lock the platform 7 in position and avoid that it be projected rearwardly during dismounting or landing of the snowmobile.

More specifically, and according to a first preferential embodiment of the invention, the braking means are constituted by the aforementioned movable member in the form of a plate 15 mounted beneath the platform 7 at the forward part 13. The plate 15 is provided with at least one, preferably two, rib 17 on the upper face thereof extending transversely to the direction of movement of the snowmobile, direction indicated by the arrow in Fig. 1. The ribs 17 pass freely through an opening 19 formed across the platform 7. Thus, the ribs 17 protrude and extend beyond the upper face of the platform 7.

The afore-described braking means also comprises resilient means biasing the plate 15 against the platform 7. The latter means, as particularly illustrated in Fig. 4, are in the form of two bolts 21 made solid with one end of the platform 7 on either side of the opening 19. These bolts 21 extend freely across the plate 15 and springs 23 surround them and are respectively applied against the undersurface of the plate 15 and against the heads of the bolts 21.

Finally, the braking means comprises three shoes 25 arranged beneath the plate 15 and intended to be applied against the ground when the endless track presses on the ribs 17. The braking shoes 25 may be in the form of wooden blocks mounted transversely of the plate 15 and provided with a strip of anti-skidding material such as rubber on the face thereof intended to engage the ground.

It would be noted, in FIGS. 1, 2 and 3, that the plate 15 extends beyond the forward part 13 of the platform 7 in order to serve as landing platform for the snowmobile, this extension being provided forwardly with a ground-engageable shoe 25 which is one of the three shoes mentioned previously.

Perusal of FIGS 1 and 3 will show that the rearward part 11 of the platform 7 is provided at its end with a strip 27 made of semi-rigid material and having transverse friction corrugations. This strip may be made of reinforced rubber, for instance, and is intended to serve as loading platform for the snowmobile.

In order to allow positive displacement of the endless track on the platform 7 and thus avoid skidding, metal rods 29 may be provided on part 11, being spaced from one another and extending transversely of the said part 11. On the other hand, anti-friction rods 31 may also be provided on each side of the forward part 13 in order to ensure sliding of the skis when the snowmobile moves on the platform 7 and particularly when the skis reach the crossbar of the T-shaped platform. This situation is clearly illustrated in Fig. 1 where the skis 5 may be shown in inclined position as they move onto the forward part 13. Rods 31 may preferably be made of nylon.

With respect to FIGS. 5 and 6 illustrating a second preferential embodiment of the braking means, the latter are formed by two locking bolts 33 extending freely vertically across the forward part 13 of the platform 7 and having heads 35 and 37 at the ends to avoid being inadvertently removed from the platform 7. A spring 39 is provided between the upper head 35 and the undersurface of the platform 7. The bolt 33 has a length sufficient to engage the ground when pressed by the snowmobile as it moves forwardly, as illustrated in Fig. 6. The released position of this braking means is illustrated in Fig. 5.

The head 37 of the bolt 33 may be provided with a rubber damper 41 if it is intended to protect the bearing surface over which the apparatus is displaced.

Referring now to Fig. 5, the apparatus also comprises a second platform 43 pivotally mounted at one end beneath the first platform 7 and having a portion extending beyond the forward part 13 of the platform 7 whereby to serve as a landing platform for the snowmobile. From Fig. 5, elastic means 45 will be noted, such means being similar to the spring-biased bolts 21 of Fig. 4 and adapted to hold the second platform 43 against the first one when the endless track 3 does not bear on the said platform 43.

As is the case with the extension of the plate 15 (FIG. 3), the second platform 43 has transverse blocks 47 intended to ensure positive displacement of the endless tread. Guards 48 (FIG. 3) may also be provided along the lateral edges of the forward part 13.

It is to be noted that the platform 43 has a length such that the snowmobile may be fully received thereon without the endless track 3 reaching the forward part of the platform, where the braking means are located, the latter remaining released, the platform 7 may freely be displaced.

Finally, the strip 27, which may be more or less rigid, must obviously be sufficiently long to squarely rest on the ground, the weight of the snowmobile over the band 27 thus avoiding undesired displacement of the platform during loading of the snowmobile.

I claim:

1. An apparatus to displace a snowmobile having steering skis at the front and a driving endless track at the rear, the track extending centrally longitudinally of the snowmobile, said apparatus comprising:
   a. a platform mounted on swivelling wheels whereby to be displaced in all direction, said platform having a rearward part for the climbing thereon of the snowmobile and a forward part for the dismounting thereof;
   b. braking means at the forward end of said platform and across the path of the snowmobile, said braking means comprising a vertically movable member capable of being depressed under the weight of the snowmobile through the endless track thereof to apply a pressure on the ground in order to lock said platform and prevent that it moves away when the snowmobile dismounts;
   c. said platform having a length such as to fully receive the snowmobile without the latter reaching said forward part and actuating said braking means, whereby said apparatus may be freely displaced;
   d. wherein said braking means comprises:
      the said movable member formed as a plate mounted beneath the platform at the forward part thereof, said plate having at least one rib, on the upper face thereof, extending transversely to the direction of movement of the snowmobile, said rib passing freely through an opening formed across said platform and having a height such as to protrude and extend beyond the upper surface of said platform;
      resilient means biasing said plate against said platform, and
      at least one braking shoe mounted beneath said plate and adapted to be applied against the ground when the endless track of the snowmobile presses on said rib during displacement of the snowmobile toward said said part.

2. An apparatus as claimed claim 1 wherein said plate extends beyond said forward part and serves as landing platform for the snowmobile and is provided forwardly with a braking shoe applicable on the ground.

3. An apparatus as claimed in claim 1 wherein said resilient means comprises bolts secured to said platform on either side of said opening; said bolts extending freely across said plate and springs surrounding said bolts and respectively applied against the undersurface of said plate and against the heads of said bolts.

4. An apparatus as claimed in claim 1 wherein said platform is T-shaped of which the crossbar forms said forward part and the stem the rearward part; a transversely corrugated strip of semi-rigid material secured to said forward part to act as a loading platform for the snowmobile.

5. An apparatus to displace a snowmobile having steering skis at the front and a driving endless track at the rear, the track extending centrally longitudinally of the snowmobile, said apparatus comprising:
  a. a platform mounted on swivelling wheels whereby to be displaced in all directions, said platform having a rearward part for the climbing thereon of the snowmobile and a forward part for the dismounting thereof;
  b. braking means at the forward end of said platform and across the path of the snowmobile said braking means comprising a vertically movable member capable of being depressed under the weight of the snowmobile through the endless track thereof to apply a pressure on the ground in order to lock said platform and prevent that it moves away when the snowmobile dismounts;
  c. said platform having a length such as to fully receive the snowmobile without reaching said forward part and actuating said braking means, whereby said apparatus may be freely displaced, and
  d. wherein said braking means comprises: said movable member in the form of a pair of locking bolts extending freely across said forward part and each having a head at each end to prevent removal from said platform and a spring between the upper head of each bolt and the upper surface of said platform; said bolts having a length sufficient for the lower head to be applied against the ground upon being depressed by the snowmobile when the latter moves forward.

6. An apparatus as claimed in claim 5 further comprising a second platform pivotally mounted at one end beneath the first platform and having a portion thereof projecting ahead of said forward part so as to serve as landing platform, and resilient means to hold said second platform in raised position against the first platform when the snowmobile endless track does not bear thereon.

7. An apparatus as claimed in claim 5 wherein said first platform is T-shaped of which the crossbar forms said forward part and the stem the rearward part; transversely corrugated strip of semi-rigid material secured to said forward part to act as a loading platform for the snowmobile.

* * * * *